3,254,055
GALLIUM CATALYST COMBINATIONS FOR
LINEAR POLYESTER MAKING
James Graham Smith, Kingsport, Tenn., assignor to Eastman Kodak Company, Rochester, N.Y., a corporation of New Jersey
No Drawing. Filed Oct. 18, 1962, Ser. No. 231,556
12 Claims. (Cl. 260—75)

This application is a continuation-in-part of my copending application Serial No. 138,602, filed on September 18, 1961, now abandoned.

This invention relates to novel catalysts and combinations of catalysts useful in preparing fiber and film-forming linear condensation-type polyesters of bifunctional dicarboxylic acids and bifunctional glycols, e.g. polyethylene terephthalate. In particular, this invention relates to the use of gallium or its compounds during the process involving polymerization of prepolymer, that is, during the final buildup. A particularly useful catalytic combination consists essentially of zinc or a compound thereof in conjunction with gallium or a compound thereof, which combination is effective for the overall polymerization process.

The preparation of polyesters of the type with which this invention is concerned is well known in the art. One of the patents relating to this field is U.S. Patent No. 2,465,319 where a large number of catalysts are listed. This patent mentions the use of zinc compounds as catalysts. A number of other patents mention the use of various zinc catalysts and combinations of zinc catalysts with other compounds. However, it is apparent from a consideration of the prior art that no predictions are possible as to what improvements or detrimental effects will be obtained when new elements or a given combination of elements or their compounds are employed. Sometimes synergistic results are achieved but sometimes the results are merely additional and other times they are detrimental.

Since zinc and its compounds are primarily limited to utility during the ester exchange stage of the reaction between a diakyl ester of a bifunctional dicarboxylic acid and a glycol, the prior art explains how other catalysts which are more effective during the final buildup can be employed along with the zinc catalysts. Similar disclosures relate to other ester exchange catalysts. Antimony trioxide and other compounds of antimony are known to be quite useful in those stages of the polymerization process which involve formation of higher molecular weight prepolymer and particularly during the final buildup. It is convenient to initially add the catalyst intended for use during the final buildup along with the other catalyst intended as an ester exchange catalyst. Thus, a binary mixture of zinc borate and antimony trioxide can be added at the beginning of the condensation of dimethyl terephthalate and ethylene glycol and produces useful results during the entire polymerization process.

One of the most critical problems in selecting catalysts for use in preparing polyesters is the avoidance of color and cloudiness (hazy polymer melt) in the final built-up polyester being produced. This is especially crucial in the case of those polyesters to be used to form a support or film base for photographic emulsions (either color or black-and-white) where the optical requirements are such that a substantially colorless and clear polyester is of great importance. Binary or ternary catalytic compositions can be used whereby catalytic compounds which form differently colored products can cancel the coloration caused by the various components of the binary or ternary components. Thus, practically neutral coloration can be achieved by this latter technique; for example, using cobaltous acetate and zinc acetate as a binary catalyst produces a neutral color. On the other hand, using cobaltous acetate and manganese formate produces a lavender-colored polyester. These considerations illustrate the difficulties associated with selecting useful catalysts, especially for use as photographic film base. For most purposes, it is extremely desirable to have a substantially colorless film base.

It is an object of this invention to provide a new combination of catalysts useful for preparing fiber and film-forming linear condensation-type polyesters which are substantially colorless, clear, and useful as photographic film base for black-and-white or color-type emulsions. The term colorless applies to the polyester melt and to films and other shaped articles; such a colorless polyester in fiber form will usually appear white.

It is an additional object of this invention to provide such catalysts which are more active than the previously known catalysts having color-free characteristics so that polyesters of the desired intrinsic viscosity can be produced in a substantially shorter period of time which are substantially colorless.

It is a further object of this invention to provide a new catalyst, namely gallium or non-color-forming compounds thereof, which is especially useful during the final buid-up stages of a process for making linear condensation-type polyesters.

It is another object of this invention to provide a process for preparing linear condensation-type polyesters using a gallium catalyst.

An additional object is to provide a gallium-containing catalytic composition which is effective at low concentrations and yet produces reasonably rapid reactions at all stages of the preparation of polyesters being formed from the condensation of the lower dialkyl ester of a bifunctional dicarboxylic acid with a bifunctional glycol.

Other objects will become apparent elsewhere herein.

According to a preferred embodiment of this invention there is provided a catalytic composition useful in preparing condensation-type linear polyesters from a dialkyl (1–4 carbon atoms) ester of a bifunctional dicarboxylic acid and a bifunctional glycol comprised essentially of two elements as follows: (a) a member selected from the group of elements consisting of those have activity as ester-interchange catalysts such as magnesium, calcium, zinc, cadmium, manganese, etc. and (b) gallium, said elements being present as members selected from the group consisting of non-color-forming compounds such as the alkoxides or alkylates having from 1 to 6 carbon atoms in each akyl radical, iodides, carbonates, lower alkanoic acid (2–8 carbon atoms) salts, oxides, hydrated oxides, ammino halides, etc. as well as the free elements, i.e. unreacted free metals, the proportions being such that there is from about 0.2 to 75 atoms of said element (a) for each atom of gallium, said catalytic composition being useful in preparing such polyesters which are substantially clear and colorless in the form of a melt or an extruded transparent film. An especially preferred range if from about 1 to about 50 atoms of said element (a) for each atom of gallium.

Among the various gallium compounds encompassed within the scope of this invention are basic gallium acetate, gallium iodide, gallium oxide, hydrated gallium oxide, ethyl gallium, gallium ammonium chloride (or fluoride, iodide or bromide), gallium ethoxide, gallium butoxide, gallium proprionate, gallium butylrate, gallium carbonate, etc. The free metallic gallium can be employed in the form of ribbon, small pieces or powder. Gallium or its compounds can be used as solutions or suspended in ethylene glycol or other glycols or alcohols, e.g. 1,4-cyclohexanedimethanol, glycerin, methanol, ethanol, etc.

There is no reason in this specification to indulge in an extensive elaboration of the various processes which can be employed in preparing polyesters. U.S. Patent 2,465,319, U.S. 2,727,881, U.S. 2,744,089, U.S. 2,901,466, etc. describe such processes in great detail. A common feature of all of the processes with which this invention is concerned is that they begin with a lower dialkyl ester o fa bifunctional dicarboxylic acid which is condensed with a bifunctional glycol, the glycol usually being used as such although it can be used in the form of lower alkanoic acid ester thereof, such esters being equivalents of the glycol.

The processes with which this invention is concerned involve the initial preparation in the presence of a catalyst of a substantially monomeric protopolymer under conditions facilitating removal of the lower alkanol formed from said lower dialkyl ester by ester interchange with said glycol. This is sometimes referred to as the first stage of the polyester preparation and can be conducted under a variety of conditions using many different types of apparatus. For example, the lower dialkyl ester and the glycol in a mol ratio beginning at about 1 to 1 up to 1 to 2.5 can be placed in a reaction vessel equipped with a packed column with the vessel being heated at a temperature which permits the lower alkanol to pass through the column with the glycol being retained by the column and returned to the reaction vessel whereby substantially all of the lower alkanol which can theoretically be produced is removed during this first stage of the polyester preparation which results in a so-called monomer or protopolymer.

The second stage of the polyester preparation involves taking the monomeric protopolymer produced during the first stage and causing such protopolymer molecules to undergo a further ester interchange reaction whereby the superfluous quantities of glycol are removed and long chain polyester molecules are produced. The polymerization of the protopolymer is accomplished under conditions facilitating removal of superfluous quantities of said glycol so that the ultimate ratio of bifunctional dicaryboxylic acid moieties to glycol moieties is essentially one to one in the polymer molecule.

The degree of polymerization is proportionate to the intrinsic viscosity of the polyester. A convenient solvent for evaluating the intrinsic viscosity (I.V.) is a mixture of 60% phenol and 40% tetrachloroethane using a temperature of 25° C. The I.V. for different polyesters does not necessarily represent the same molecular weight. The highly polymeric polyesters contemplated by this invention correspond to an I.V. of at least 0.5 for polyethylene terephthalate. Other polyesters having the same molecular weight (12,000–13,000 or higher) may have higher or lower I.V. indicative of said minimum molecular weight. As a broad generalization, it is desired that the polyesters especially useful for preparing fibers and film have an I.V. of about 0.55 or higher as evaluated using the solvent mentioned above.

The polymerization of the protopolymer is generally accomplished during the earlier phases by heating at a temperature above the boiling point of the glycol (or mix- of glycols) at whatever pressure is necessary so that the glycol can be removed by a suitable condenser or other device connected to the reaction vessel. The pressure during the first part of this operation is generally atmospheric pressure or greater since lower pressures may produce excessive frothing or other conditions impeding the operation. As the readily removable amounts of the glycol are removed, the temperature is generally raised and the pressure is generally reduced, either in increments or gradually so as to eventually result in temperatures from 10 to 100° C. above the boiling point of the glycol and pressures of no more than about 50 mm. of Hg pressure. Advantageously, the pressure is as low as the available apparatus can produce, e.g. pressures on the order of from 1 mm. down to a few microns of Hg pressure. There is nothing critical about the temperatures or pressures although it is well recognized that excessively high temperatures will cause discoloration as a result of degradation of products whereas the use of low temperatures especially in combination with relatively high pressures (several centimeters of Hg pressure) will necessitate longer reaction periods which may contribute toward discoloration. It is therefore advantageous that the pressure be less than 10 mm. of Hg pressure and the temperature generally be no more than about 75° C. above the boiling point of the glycol.

One of the processes which can be advantageously employed in the preparation of polyesters is the solid-phase polymerization process also called the powder buildup process. Such a process involves stopping the above-described polymerization process at a point where the intrinsic viscosity of the polymer (which can be called a prepolymer) is from about 0.2 to about 0.45 using the methods generally described hereinabove, comminuting the prepolymer to form particles which will preferably pass through a 20 mesh screen, and then heating these particles in a vacuum or under an inert circulating atmosphere (using any suitable pressure) at a temperature from about 10° to about 60° C. below the melting point of the polyester. The prepolymer particles can be advantageously agitated such as by fluidization and not allowed to get sufficiently hot that they fuse together. Such a powder buildup process is advantageous when a high intrinsic viscosity is desired and no appreciable coloration of the polyester can be tolerated.

As already mentioned, the prior art contains a great number of disclosures of processes which can be employed and this invention is concerned primarily with the use of gallium or the catalytic compositions thereof which can be employed in accomplishing an improvement in such processes.

A further embodiment of this invention provides a process for preparing a highly polymeric condensation-type linear polyester by heating at from 180°–300° C. a lower dialkyl (1 to 4 carbon atoms) ester of a bifunctional dicarboxylic acid (at least 50% aromatic acid having from 8 to 20 carbon atoms) and a bifunctional glycol (2 to 10 carbon atoms) in the presence of from 0.0001% to 0.1% based on the weight of said lower dialkyl ester of a catalyst essentially composed of (a) an element selected from the group consisting of magnesium, calcium, zinc, cadmium and manganese, and (b) gallium, the proportions being such that there are from about 0.2 to 50 atoms of said element (a) for each atom of gallium, whereby the polyester produced is substantially clear and colorless in the form of a melt or an extruded transparent film.

The subject matter of the present invention is somewhat related to that described in copending application Serial No. 769,573, filed October 27, 1958 by James G. Smith entitled "Synergistic Catalyst Composition Containing a Group II Metal Salt and an Arsenic Compound for Preparing Condensation-Type Polyesters." During the investigations which resulted in the present application as well as Serial No. 769,573, a great number of catalysts and catalyst combinations were evaluated wherein the final polymer either (1) had a good color but a low I.V. or (2) had a high I.V. but poor color. Using zinc acetate alone provides an example whereby polymerization can be accomplished which produces a polymer having fairly good color but the polymerization is very slow so that a high I.V. cannot be satisfactorily achieved. The use of zinc acetate under conditions to increase the rate of condensation results in serious discoloration. The use of titanium tetrabutoxide as a catalyst permits the achievement of a high I.V. polymer in a reasonably short time but it is characterized by an undesirably high degree of color. The catalyst combination described in copending Serial No. 769,573 achieves excellent results in polymerization; however, on a commercial scale this necessitates the handling of substantial amounts of toxic arsenic compounds. Hence, the discovery of the value of gallium and its compounds provides an especially advantageous process whereby highly polymeric polyesters can be produced in a short time which are substantially colorless.

As already indicated above, gallium and its compounds by themselves have practically no value during the initial stage of the reaction between a glycol and a diester of a dicarboxylic acid. The combination of zinc and gallium or various compounds thereof when used in accordance with an otherwise standard polymerization procedure enables the preparation of a polyester having a high I.V. in a short period of time; moreover, it was quite surprisingly found that the color was quite superior to that produced by using zinc acetate alone. Thus, the combination of the two metals is unexpected superior in several respects to either of the metals used alone.

Although the gallium compounds mentioned above are those which are especially preferred, any gallium compound can be used in conjunction with another catalyst under such circumstances that any disadvantageous properties of the gallium compound are neutralized by the other catalytic compound or some other constituent in the reaction.

Although a preferred embodiment of this invention encompasses a combination of a Group II metal along with gallium, it is also feasible to employ a Group I alkali metal such as in the form of sodium acetate, lithium hydride, potassium ethoxide, solutions thereof in a glycol, etc. The present invention contemplates the possibility of using combinations of more than two catalytic metals and also contemplates the possible presence of stabilizers, antioxidants, pigments, etc. during the polymerization process. Illustrations of such additional constituents include titanium dioxide, diethyl hydrogen phosphate, butylated hydroxy-toluene, esters of thiodipropionic acid, aryl amines, various phosphates or phosphites, carbon black, etc.

The invention can be further illustrated by the following examples of preferred embodiments and comparative examples although it will be understood that the examples of the invention are included merely for purposes of illustration and are not intended to limit the scope of the invention unless otherwise specifically indicated.

*Example 1A*

A mixture of 38.8 g. (0.2 mole) of dimethyl terephthalate, 24.8 g. (0.4 mole) of ethylene glycol, 0.8 ml. of a solution of 4.39 g. of zinc acetate dihydrate dissolved in ethylene glycol and 40 mgm. of basic gallium acetate were charged into a 250 ml. flask. The flask was swept with nitrogen and immersed in a metal bath and held at 185° to 195° C. When molten, the solution was stirred. Methanol evolved rapidly and the alcoholysis was complete in thirty minutes. The colorless melt was then heated to 280–285° C. and the pressure reduced to less than 0.5 mm. of mercury. The melt was stirred under vacuum at 280° C. for sixty minutes. The final polymer was essentially colorless and had an inherent viscosity of 0.76 (60:40 tetrachloroethane:phenol).

*Example 1B*

Employing the conditions set forth in Example 1A but omitting the basic gallium acetate resulted in the formation of a discolored product having a lower I.V. See Table I below.

*Example 1C*

Employing the conditions set forth in Example 1A except that zinc acetate was omitted resulted in no reaction during the initial stages of the reaction, hence the experiment was discontinued. This demonstrates that gallium compounds alone are ineffective during the initial ester exchange phase of the condensation.

The following Table I summarizes the results obtained with various catalyst combinations. The above examples are included in the table for comparison. The expression "colorless" applies to the polymer melt after 60 minutes under vacuum at about 280° C., and this expression means that there was no noticeable color. The amounts shown are given as percent by weight of metal in the final polymer.

TABLE I.—CATALYST COMBINATIONS FOR THE PREPARATION OF POLYETHYLENE TEREPHTHALATE

| Ex. | Ester-Interchange Catalyst | Amount | Gallium Compound | Amount | I.V. | Polymer Melt Color |
|---|---|---|---|---|---|---|
| 1A | Zn(OAc)$_2$ | 0.04 | Basic Acetate | 0.04 | 0.76 | Colorless. |
| 1B | Zn(OAc)$_2$ | 0.04 | | | 0.69 | Yellow. |
| 1C | | | Basic Acetate | 0.04 | | No reaction. |
| 2 | Zn(OAc)$_2$ | 0.04 | ----do---- | 0.02 | 0.71 | Colorless. |
| 3 | Zn(OAc)$_2$ | 0.02 | ----do---- | 0.02 | 0.68 | Do. |
| 4 | Mg(OAc)$_2$ | 0.03 | Iodide | 0.03 | 0.75 | Do. |
| 5 | Mg(OAc)$_2$ | 0.03 | Basic Acetate | 0.04 | 0.71 | Do. |
| 6 | Ca(OAc)$_2$ | 0.03 | Iodide | 0.03 | 0.77 | Do. |
| 7 | ZnO | 0.04 | Oxide | 0.04 | 0.75 | Do. |

Examples 2 and 3 show that the use of gallium permits a substantial reduction in the other catalytic element without much change in the I.V. of the polymer produced.

The solid phase process can also be employed for the preparation of high molecular weight polyethylene terephthalate as follows:

*Example 8A*

The procedure described in Example 1A was repeated except that the melt was stirred under vacuum at 280° C. for seven minutes. The product was a colorless, brittle material having an I.V. of 0.17. This material was pulverized to pass a sixty mesh screen and the powder heated at 220° C. and 0.07 mm. pressure for three hours and then for an additional three hours at 240° C. and 0.07 mm. of mercury pressure. The final polymer had an I.V. of 1.06 and the color of the powder was white.

*Example 8B*

A similar condensation was performed as described in Example 8A except that zinc acetate was used alone as a catalyst. The final product has a viscosity of only 0.65 and had a yellow discoloration.

The results achieved as illustrated in the preceding examples can also be obtained using other glycols such as neopentyl glycol, 2,2,4,4-tetramelthyl-1,3-cyclobutanediol, 1,4-cyclohexanedimethanol, polytetramethylene glycol, or any other of the glycols such as illustrated in U.S. Patent No. 2,901,466. The dimethyl terephthalate employed in the preceding examples can be similarly replaced entirely or partially with diethyl terephthalate, dimethyl isophthalate, or other alkyl esters of terephthalic acid or isophthalic acid as well as the alkyl esters of other aromatic dicarboxylic acids or mixtures of esters of such acids with esters of aliphatic dicarboxylic acids such as illustrated in U.S. 2,901,466.

The gallium, zinc or other metals can be added to the mixture of glycol and acid diester as free metals or as compounds thereof or as solutions or suspensions in solvents such as ethylene glycol or the like. It is convenient to use catalytic mixtures as solutions or suspensions in whatever glycol is to be used in the preparation of the polyester.

In addition to the particular catalysts described hereinabove, it is also possible to practice the invention in the presence of other additional catalysts such as antimony trioxide, litharge, magnesium titanium butoxide, etc. Of course, any such compounds which tend to increase the color should not be used unless the product is to be pigmented, dyed or otherwise used under circumstances where coloration is inconsequential. Although the above examples indicate that gallium and Group II metals in the form of alkanoate salts can be advantageously employed, partial or complete replacements may be made with the same metals in the form of oxides, hydroxides, alkoxides, iodides, alkylates, carbonates or other colorless salts. For example, zinc diethyl, zinc ethoxide, zinc carbonate, etc. can be used in lieu of zinc acetate. However, zinc acetate is generally to be preferred since it is readily available in a highly purified form and can be handled in an efficacious manner.

*Examples 9A-9F*

The procedure described in Example 1A was repeated using about 0.0100% to 0.0130% of zinc as zinc acetate dihydrate and 0.0002% to 0.0075% of gallium as gallium ammonium chloride. The latter was used in lieu of the basic gallium acetate employed in Example 1A. Example 9F is presented to show the results when no gallium is present. Gallium ammonium chloride is especially advantageous since it is quite soluble in ethylene glycol at room temperature. This compound is described in Gmelin's Handbook der Anorganischen Chemie. The results obtained are set forth in Table II as follows (Example 9F is given for comparative purposes):

TABLE II.—CATALYST COMBINATIONS FOR THE PREPARATION OF POLYETHYLENE TEREPHTHALATE

| Example | Amount of Zinc | Amount of Gallium | I.V. | Polymer Melt Color |
| --- | --- | --- | --- | --- |
| 9A | 0.0120 | 0.0075 | 0.68 | |
| 9B | 0.0130 | 0.0050 | 0.67 | Clear, very slightly yellow. |
| 9C | 0.0100 | 0.0025 | 0.65 | |
| 9D | 0.0100 | 0.0013 | 0.63 | |
| 9E | 0.0100 | 0.0002 | 0.68 | Clear, colorless. |
| 9F | 0.0100 | None | 0.53 | Slight yellow and hazy. |

*Examples 10A-10D*

The procedure described in Example 1A was repeated using 0.0070% zinc as zinc acetate dihydrate and from 0.0002% to 0.0007% gallium as gallium ammonium chloride. Example 10D is presented to show the results when no gallium was present. See the data in Table III as follows:

TABLE III.—CATALYST COMBINATIONS FOR THE PREPARATION OF POLYETHYLENE TEREPHTHALATE

| Example | Amount of Zinc | Amount of Gallium | I.V. | Polymer Melt Color |
| --- | --- | --- | --- | --- |
| 10A | 0.0070 | 0.0007 | 0.62 | |
| 10B | 0.0070 | 0.00035 | 0.68 | Clear, colorless. |
| 10C | 0.0070 | 0.0002 | 0.63 | |
| 10D | 0.0070 | None | 0.46 | Slight yellow and hazy. |

As can be seen from Tables II and III, the results are superior to those shown by Table I wherein considerably greater amounts of zinc were employed. Without the concurrent use of gallium the amounts of zinc employed as shown by Tables II and III are inadequate to obtain an I.V. high enough for utility in the preparation of satisfactory film since an I.V. of 0.55 is about as low as can be ordinarily considered useful, and the I.V. should usually be no lower than 0.6. Example 1B illustrates the poor color obtained when an adequate amount of zinc is employed by itself.

*Examples 11 and 12*

The procedure described in Example 1A was repeated using hydrated gallium oxide $Ga_2O_3 \cdot 1\frac{1}{2}H_2O$ as the source of gallium along with one of two other metals as the second catalyst. The percentages apply to the amount of metal present in the polymer obtained. See Table IV as to the results obtained using calcium acetate as the source of calcium. See Table V as to the results obtained using manganese diacetate as the source of manganese.

TABLE IV.—CATALYST COMBINATIONS FOR THE PREPARATION OF POLYETHYLENE TEREPHTHALATE

| Example | Amount of Ca | Amount of Ga | I.V. | Polymer Melt Color |
| --- | --- | --- | --- | --- |
| 11A | 0.0300 | 0.0100 | 0.66 | Clear, very light yellow. |
| 11B | 0.0300 | 0.0200 | 0.73 | Clear, light yellow. |
| 11C | 0.0300 | 0.0300 | 0.78 | Do. |
| 11D | 0.0300 | None | 0.44 | Hazy, light yellow. |

TABLE V.—CATALYST COMBINATIONS FOR THE PREPARATION OF POLYETHYLENE TEREPHTHALATE

| Example | Amount of Mn | Amount of Ga | I.V. | Polymer Melt Color |
| --- | --- | --- | --- | --- |
| 12A | 0.0100 | 0.0100 | 0.58 | Clear, colorless. |
| 12B | 0.0075 | 0.0010 | 0.63 | Clear, light yellow. |
| 12C | 0.0075 | None | 0.47 | Do. |

It can be seen that good polymers of excellent color can be obtained using gallium in conjunction with various known catalysts. For example, as shown by Table IV, calcium acetate alone produces a hazy polymer. This hazy quality gets worse if larger amounts of calcium are employed in an attempt to increase the I.V. to a range useful for film making. The use of a small amount of gallium not only eliminates the cloudiness but improves the color, as exemplified by Example 11A, and greatly increases the I.V. Example 1C shows that even 0.0400% gallium by itself is not effective as a catalyst.

In addition to the gallium ammonium chloride illustrated above, other useful related compounds include those having the formula $GaX_3 \cdot nNH_3$ where X may be chlorine, bromine or iodine and $n$ may be an integer of from 1 to 14, see Gmelin's Handbook.

The results set forth in the above tables can also be obtained with poly(1,4-cyclohexylenedimethylene terephthalate), poly(1,5-pentamethylene 4,4'-sulfonyldibenzoate) and other polyesters of this type. Especially advantageous results are obtained as regards the terephthalate polyesters including modifications thereof such as are now commercially produced in film form under such trademarks as Mylar, Plestar, Cronar, Estar, Kodar, etc. The terephthalate polyesters useful for manufacturing film may include minor proportions of isophthalic, adipic, azelaic, 1,4-cyclohexanedicarboxylic, and other aliphatic, alicyclic and aromatic acids having from 2 to 20 carbon atoms which can constitute up to 45% or more of the total dicarboxylic acid constituents.

The term "bifunctional" as used in this specification has the same meaning as it has in the numerous patents appearing in the prior art and as defined by Carothers in his early patents regarding the preparation of polyesters. Quite obviously the reactants must be essentially bifunctional since otherwise the polyesters produced will not be linear oxy-carboxy-linked polyesters. The term bifunctional excludes olefinically unsaturated reactants in any significant quantity as well as reactants which contain other functional groups such as amino groups, isocyanate groups, etc. Of course, small traces of glycerine, maleic anhydride, etc. can be tolerated, if desired.

The invention has been described in detail with particular reference to preferred embodiments thereof, but it will be understood that variations and modifications can be effected within the spirit and scope of the invention as described hereinabove and as defined in the appended claims.

I claim:

1. An improved process for preparing a highly polymeric linear polyester comprising heating the following constituents until an inherent viscosity of at least 0.5 is obtained as measured at 25° C. in a mixture of 60% of phenol and 40% of tetrachlorethane, by weight, said heating being at an elevated temperature of from about 180° C. to about 300° C.:
   (1) one mole proportion of at least one dialkyl ester of a dibasic carboxylic acid, said alkyl radicals containing from 1 to 4 carbon atoms,
   (2) from about one to about 2.5 mole proportions of a glycol, and
   (3) from about 0.0001% to about 0.1%, based on the weight of said lower dialkyl ester, of a catalyst consisting essentially of
      (a) a compound of a metal capable of catalyzing an ester interchange between said dialkyl ester and said glycol and which is selected from the group consisting of magnesium, calcium, zinc, cadmium, maganese and
      (b) a compound of gallium, the proportions of (a) and (b) being such that there are from about 0.2 to 75 atoms of a metal of said catalyst constituent (a) for each atom of gallium.

2. A process as defined by claim 1 wherein said catalyst constituent (a) is zinc acetate.

3. A process as defined by claim 1 wherein said catalyst constituent (a) is magnesium acetate.

4. A process as defined by claim 1 wherein said catalyst constituent (a) is calcium acetate.

5. A process as defined by claim 1 wherein said catalyst constituent (a) is manganese acetate.

6. A process as defined by claim 1 wherein said compound of gallium is gallium ammonium chloride.

7. A process as defined by claim 2 wherein said compound of gallium is gallium ammonium chloride.

8. A process as defined by claim 3 wherein said compound of gallium is gallium ammonium chloride.

9. A process as defined by claim 4 wherein said compound of gallium is gallium ammonium chloride.

10. A process as defined by claim 5 wherein said compound of gallium is gallium ammonium chloride.

11. A process as defined by claim 1 wherein constituent (1) is dimethyl terephthalate and constituent (2) is ethylene glycol.

12. A process as defined by claim 6 wherein constituent (1) is dimethyl terephthalate and constituent (2) is ethylene glycol.

References Cited by the Examiner

UNITED STATES PATENTS

| | | | |
|---|---|---|---|
| 1,935,177 | 11/1933 | Connolly et al. | 252—463 XR |
| 1,935,178 | 11/1933 | Connolly | 252—463 XR |
| 2,523,686 | 9/1950 | Engel | 252—465 XR |
| 2,820,023 | 1/1958 | Cavanaugh et al. | 260—75 |
| 2,824,089 | 2/1958 | Peters et al. | 252—465 XR |
| 2,901,466 | 8/1959 | Kibler et al. | 260—75 XR |
| 3,055,869 | 9/1962 | Wilson et al. | 260—75 |

OTHER REFERENCES

Menold: pages 801–805, Chemie-Ingenieur-Technik, vol. 32, 1960, T.P.I.

WILLIAM H. SHORT, *Primary Examiner.*

LOUISE P. QUAST, *Examiner.*